United States Patent
Alvarellos Iglesias et al.

(10) Patent No.: US 11,220,903 B2
(45) Date of Patent: Jan. 11, 2022

(54) METHOD OF DETERMINING MAXIMUM STRESS IN A WELL DRILLED IN A RESERVOIR

(71) Applicant: Repsol, S.A., Madrid (ES)

(72) Inventors: José Alvarellos Iglesias, Madrid (ES); José María Segura Serra, Madrid (ES); Marta Dueñas Díez, Madrid (ES); Enric Ibañez Martinez, Madrid (ES); Lakshmikantha Mookanahallipatna Ramasesha, Madrid (ES); Almudena Díaz Aguado, Madrid (ES)

(73) Assignee: REPSOL EXPLORACIÓN, S.A, Madrid (ES)

( * ) Notice: Subject to any disclaimer, the term of this patent is extended or adjusted under 35 U.S.C. 154(b) by 92 days.

(21) Appl. No.: 16/590,674

(22) Filed: Oct. 2, 2019

(65) Prior Publication Data
US 2020/0102822 A1    Apr. 2, 2020

(30) Foreign Application Priority Data
Oct. 2, 2018    (EP) .................................... 18382699

(51) Int. Cl.
*E21B 49/00*    (2006.01)
*G06F 30/20*    (2020.01)
*G06F 111/10*   (2020.01)

(52) U.S. Cl.
CPC ............ *E21B 49/006* (2013.01); *G06F 30/20* (2020.01); *G06F 2111/10* (2020.01)

(58) Field of Classification Search
CPC .... G06F 30/20; G06F 2111/10; E21B 49/006; E21B 47/10
See application file for complete search history.

(56) References Cited

U.S. PATENT DOCUMENTS

2013/0275099 A1* 10/2013 Frydman ................. E21B 47/10
                                                      703/2

OTHER PUBLICATIONS

Abdollah Molaghab "Determination of minimum and maximum stress profiles using wellbore failure evidences" (Year: 2017).*
Cui Lin "In-Situ Stress Estimation by Back Analysis Based on Wellbore Deformation with Consideration of Pore Pressure" (Year: 2016).*
Mohammad Abdideh "Analysis of Deep Stress Field using well log and wellbore breakout data: a case study in creataceous oil reservoir, Southwest Iran" (Year: 2018).*

(Continued)

*Primary Examiner* — Regis J Betsch
*Assistant Examiner* — Kaleria Knox
(74) *Attorney, Agent, or Firm* — Reising Ethington P.C.

(57) ABSTRACT

A method of determining maximum stress in a well drilled in a reservoir, primarily a hydrocarbon reservoir, where there is at least one zone. Collapse regions are produced while drilling a well because the material of the wall of the well exceeds its maximum allowable stress, the material fractures and falls off, leaving a cavity. The caliper of the damaged zone is measured by devices that extend radially until coming into contact with the physical wall of the well. The disclosed method determines the maximum allowable stress based on the caliper measurements and other variables which are determinable.

12 Claims, 5 Drawing Sheets

(56) References Cited

OTHER PUBLICATIONS

Hong Han "Determination of In-Situ Stress and Geomechanical Properties from Borehole Deformation" (Year: 2018).*

Abdollah Molaghab et al., "Determination of minimum and maximum stress profiles using wellbore failure evidences: a case study—a deep oil well in the southwest of Iran", Journal of Petroleum Exploration and Production Technology, vol. 7 No. 3, Sep. 1, 2017, pp. 707-715, XP055573967, ISSN: 2190-0558, 001: 10.1007/s13202-017-0323-5 (9 pages).

Cui Lin et al., "In-Situ Stress Estimation by Back Analysis Based on Wellbore Deformation with Consideration of Pore Pressure", International Journal of Geohazards and Environment, vol. 2 No. 1, Jan. 1, 2016, pp. 2-16, XP05557 4022, ISSN: 2368-5905, 001: 10.15273/ijge.2016.01.002 (15 pages).

Hong Han et al., "Determination of In-Situ Stress and Geomechanical properties from Borehole Deformation", Energies, vol. 11 No. 1, Jan. 5, 2018, p. 131, XP055574036, 001:10.3390/en11010131 (13 pages).

Mohammad Abdideh et al., "Analysis of deep stress field using well log and wellbore breakout data: a case study in cretaceous oil reservoir, southwest Iran", Geodesy and Cartography, vol. 44 No. 4, Jan. 10, 2018, pp. 113-128, XP05557 4029, ISSN: 2029-6991, 001:10.3846/gac.2018.4152 (16 pages).

European Search Report for Application No. EP18382699 dated Mar. 25, 2019 (2 pages).

* cited by examiner

METHOD OF DETERMINING MAXIMUM STRESS IN A WELL DRILLED IN A RESERVOIR

CROSS-REFERENCE TO RELATED APPLICATION

This application claims the benefit of European Patent Application No. 18382699.9, filed Oct. 2, 2018, the entire contents of which are hereby incorporated by reference.

TECHNICAL FIELD

The present invention relates to a method of determining maximum stress in a well drilled in a reservoir, primarily a hydrocarbon reservoir, where there is at least one collapsed zone or region.

Collapsed regions are produced while drilling a well because the material of the wall of the well exceeds its maximum allowable stress, the material fractures and falls off, leaving a cavity.

Throughout the application document, it will be understood that the well has a circular section and does not necessarily follow a rectilinear path. The caliper, for a given section of the borehole, is the maximum measurement in the radial direction between the theoretical circumference of the circular section of the well and the point of greatest depth of the cavity of the collapse region.

This distance can be measured by means of devices such as touch probes that extend radially until coming into contact with the physical wall of the well.

Of all the variables referring to the state of stress of the rock, maximum allowable stress is not measurable, and it is a variable which is, despite being of enormous interest when designing operating plans in a hydrocarbon reservoir, very difficult to determine, and only methods that estimate the value thereof are known.

The claimed method determines the maximum allowable stress based on the caliper measurements and other variables which in fact are determinable, such as minimum stress.

BACKGROUND OF THE INVENTION

Drilling a well for operating gas or oil reservoirs is a very economically expensive project and the operating conditions of the drilling depend on many variables with respect to which there is not always sufficient data, giving rise to very high values of uncertainty.

This uncertainty is much higher in reservoirs in which drilling is done for the first time, where there is usually no physical sample or data which allows increasing knowledge about the geology of the area.

Likewise, in order to drill second wells, it is important to have a lower degree of uncertainty based on measurements and information obtained in the reservoir itself and in nearby wells which were drilled at an earlier time.

Drilling a well generates an empty tubular space obtained when the rock that took up said space is removed. By using the pre-drilling state of stress and the in situ stress as a reference, drilling operations modify the state of stress primarily for two reasons: the removal of rock eliminates the structural element compensating for the state of stress of the free surface of the well that is generated; and while drilling, the drilling fluid forms a column which exerts pressure on the wall of the well depending, without taking dynamic effects into account, primarily on the level up to the surface and on the density of said drilling fluid.

In fact, one of the parameters to be modified that are used in the drilling operation is the change in density of the drilling fluid so as to change the pressure which is exerted on the wall of the well.

There are other causes which bring about stresses, such as the bit in charge of drilling through the rock, but these are understood as being necessary for breaking up and removing the rock in the space that is generated in the well.

When the drilling operation uses a drilling fluid, said drilling fluid is often injected through an inner duct of the drilling tool. The drilling tool breaks up the rock at the bottom of the well that has been drilled, generating material having various grain size distributions that must be removed. The flow of drilling fluid injected at the end of the drilling tool entrains this material obtained by drilling the rock, flowing upwards primarily through the annular space bound between the drilling tool and the already generated wall of the well, until reaching the surface where this material is discharged.

The drilling fluid rising up through the annular space exerts pressure against the generated wall of the well. The pressure depends on the weight of the column of drilling fluid existing up to the upper surface, and also on the speed of the upward flow. The weight of the column is therefore a first estimate of the pressure exerted on the free surface of the wall of the well. A second estimate takes into account the dynamic stresses of the column of drilling fluid according to flow conditions.

This pressure may be excessive, exceeding the maximum allowable stress for the rock, generating fractures, for example. This pressure may also be insufficient and may not compensate for the resistance forces of the material that has been removed to produce the well. In this case, the stresses of the rock may exceed the maximum allowable or breaking stress of the rock, causing the material on the wall to break and collapse into the well that is being drilled.

If this collapsing occurs while drilling, the drilling fluid must be capable of discharging the material generated by the drilling tool plus the collapsed material. The amount of collapsed material primarily depends on the volume of rock material that has sustained damage.

Collapses occur in virtually all wellbores. At the time of establishing the design of the drilling conditions, it is important to quantify the collapse in order to assess whether there are drilling parameters that make drilling feasible even though these collapses occur.

Once well viability has been established, knowing the optimal parameters for drilling under collapsing conditions is also of interest.

State-of-art analytical ways of assessing damage in wellbore almost exclusively consider the value of the angle measuring the width of the damage in the wall of the well. These analytical techniques use the state of stress established by the structure of the rocks forming the reservoir taking into account in situ stresses. These analytical techniques use Kirsch equations, which allow describing the state of stress around a hole in an infinite plane. There are also analytical and numerical techniques that allow estimating in situ stresses.

The analytical techniques known up until now take the hypothesis that the medium is isotropic and linear, and carry out all the calculations using the original cylindrical geometry, resulting in an incorrect calculation of stress around the well, and therefore do not allow calculating the depth of damage.

Criteria based solely on the angle covered by the damage in the wall of the well have been developed with techniques of this type known in the state of the art. There is a maximum angle referred to as angle of collapse, the value of which is established by each of the companies dedicated to drilling. It is possible to establish with this criterion the conditions under which there is considered to be excessive damage: when it is found at a given depth that the angle of damage is greater than the angle of collapse. In this case, it is established that the damage in the wall of the well prevents discharging the collapsed material during the drilling operation, the borehole being determined to be unviable.

It has been experimentally proven that the variation of the collapse angle with respect to the weight of the drilling fluid is approximately linear; nevertheless, the area of damage measured according to a cross-section, and therefore proportional to the collapsed volume, increases exponentially with respect to the weight of the fluid. In other words, minor variations of the weight of the drilling fluid give rise to minor variations of the angle of damage (used as a parameter in the state of the art), and, however, generate major variations in the volume of rock that has given way. The result is an inadequate estimate of the collapsing volume.

It may also occur that, in an attempt to reduce the angle of damage, the pressure calculated for the drilling fluid exceeds the pressure established as the upper limit, the pressure above which a crack is generated.

This criterion based on the angle of damage in the wall of the well does not take into account the depth of damage. It has experimentally been found that the described criteria applied according to the state of the art rule out certain boreholes as it is considered that there would be collapses which would not allow for drilling parameters that would make such borehole viable when, in practice, such wells would indeed be viable. This is the case of collapses having a high angle of damage but which are not very deep, generating a smaller collapse volume.

When this happens, that is, it is concluded that a given well is not viable when in actuality it is, the alternative is to look for another location of the well. Since the first location is usually determined by optimization techniques, the change of location of the well makes the initial operating plan less optimal, or the change even requires drilling two or more wells in place of the first well, considerably increasing costs and reducing productive capacity.

The present invention comprises a calculation technique which allows relating the state of stress and the damaged volume when there is a collapse by establishing as a hypothesis the shape of the collapsed region according to a cross-section of the well.

Based on this calculation technique, the invention can be applied to already drilled wells in which a collapse has occurred due to the existence of damage in the wall of the well. Based on caliper measurements, the invention uses this calculation technique to determine maximum stress $\sigma_{max}$, a variable which is not measurable according to the state of the art.

Caliper measurements are measurements taken in the drilled well, although they may also be acquired in the process of drilling with tools that touch the walls of the generated well at a given distance from the drilling tool, assuring that the damaged zones have already experienced a collapse.

One of the purposes of the invention is to obtain the value of maximum stress $\sigma_{max}$, for example, to propagate this value to other locations of the reservoir where new wells will continue to be drilled, reducing the value of uncertainty.

In order to carry out the calculations which allow estimating maximum stress $\sigma_{max}$, at least one estimate of the minimum stress $$\sigma_{min}$$

should be known. Minimum stress $\sigma_{min}$ is calculable, or at least it is possible to obtain estimates using different techniques, such as:

Drilling event (ballooning). The effect known as well ballooning is a natural phenomenon in which the rock or the material of the well absorbs drilling fluid when the drilling fluid pumps are operating, and said fluid is returned when the pumps are inactive. Indirectly, through the flow values associated with this phenomenon, it is possible to estimate the minimum stress.

By means of an LOT test (Leak-off test). During this test, the well is closed and fluid is pumped into it so as to increase the pressure that the formation experiences. Once a certain pressure has been reached, the fluid will enter or become lost in the formation, moving through the permeable paths of the rock or creating a space by means of fracturing the rock. The results of the leak-off test determine the value of maximum pressure or weight of the mud which can be applied in the well during drilling operations, and also the minimum stress.

By means of experiments referred to as "minifrac" or "DFIT". Subsequent analysis of the pressure measurements taken during hydraulic fracturing operations is carried out in all these experiments.

In other words, all these methods are based on measurements of physical phenomena that are directly related to the minimum stress $\sigma_{min}$ and according to the state of the art, one skilled in the art is capable of determining the value of said minimum stress $\sigma_{min}$.

A specific way of expressing the value of minimum stress is by means of a depth-dependent correlation.

Nevertheless, as indicated, in this field of the art there are no methods for determining or estimating the maximum stress $\sigma_{max}$ based on in situ measurements, given that said maximum stress is critical because, for example, it helps to determine the regions in which the material gives way and a fracture occurs.

It has been indicated throughout the description that the well is considered to be of a circular section defined as the section through a plane perpendicular to the drill path, i.e., perpendicular to the geometric axis of the well.

The drill path is represented throughout this description by a curve. A specific case of a curve is a vertical straight line. For convenience sake, the path will be represented as a parametric function, although it may take on other equivalent modes of expression. The advantage of a parametric expression is that for each value of the parameter, it is possible to identify a different point of the path, the path running from the beginning up to the end when the parameter is varied. Other modes of representing the path are equivalent given that based on any way mode of defining the path containing the same points of the curve, it is possible to define a parametric function that represents the same curve or an approximation of said curve under a given tolerance level.

If in a given zone of the well there is region of damage, a section perpendicular to the drill path going through the region of damage will show a configuration that exceeds the circular section given that all or part of the damaged material has experienced a collapse and fallen off. The difference between the measurement from any point of the wall of the well to the center of the circular section corresponding to the configuration without a collapse and the radius of this same circular section allows determining the depth of damage as a function of the angle around the entire perimeter of the well. The measurement having the largest depth is referred to as caliper. The present invention allows determining the maximum stress $\sigma_{max}$ in a given section of the well based on the value of the caliper measured in a well in which a collapse has taken place.

The measurement of several calipers in different sections of the well allows determining the value of maximum stress $\sigma_{max}$ along the drill path.

SUMMARY

The present invention solves the problems identified in the preceding section by providing a computer-implemented method of determining the maximum stress $\sigma_{max}$ in a well drilled at a point of a path $\vec{r}(t)$ describing a reservoir comprising collapsed regions.

The method comprises the following steps:
a) generating a geomechanical computational model in a domain comprising the path $\vec{r}(t)$ of the well that is drilled by at least incorporating rock data and the mechanical properties thereof and wherein said geomechanical computational model also comprises:
  1. the measurement of the diameter D of the well,
  2. the measurement of the value of the caliper C (t) measured in at least one collapsed zone, and
  3. a pre-established function of the minimum stress $\sigma_{min}(t)$;
b) generating a fluid computational model in the same domain by at least incorporating data about the density $\gamma(z)$ of the drilling fluid used in each level of vertical depth $z(t)$ from the surface of the reservoir while drilling the well, wherein said fluid computational model models the rock as a porous medium and comprises the pore pressure $p_p$ in said porous medium.

The domain is a previously specified region comprising the path of the well to be drilled. By using gas or oil reservoirs as an example, said reservoirs are formed primarily by porous rocks which store the gas or oil trapped in the pores thereof. The domain can contain the reservoir and be more widespread, even including the portion of rock which reaches the surface of the Earth. It can likewise be smaller than the reservoir, covering only part of said reservoir, even though it should in fact cover the path to be drilled. In applications of another type, the fluid can be water, for example. The mechanical behavior of the rock depends on both the mechanical properties of the rock and on the influence of the fluid trapped in the pores of the rock due to the pressure of said fluid. In particular, at least the mechanical properties of the rock, the properties of the fluid trapped in the rock, and also the drilling fluid which is in contact with the surface of the well that is generated when said fluid is used while drilling, are relevant.

Steps a) and b) are carried out by means of a computational system. The geomechanical computational model also incorporates the configuration of the well, the path $\vec{r}(t)$ of the drilled well being defined. The geometry of the well is circular, hence included among the data of the well is the measurement of the diameter D of the well.

Another measurement taken in the drilled well in at least one collapsed zone is the caliper C (t). When tools with touch probes are used while drilling the well, said touch probes record, within a given set of radii, the values of the depth of the wall. If there is no collapse, the measurements show the irregularities of the wall with respect to a cylindrical surface having a circular section. If there is a collapse, the touch probe following the wall measures the depth of damage.

When the tool measuring the wall of the well with touch probes turns, it records the depth of damage in the entire periphery, and it is possible to determine the depth of damage as a function of the angle around the axis defined by the drill path.

The measurement of greatest depth of the region of damage in a given section of the well corresponds to the caliper.

The geomechanical computational model incorporates the rock data at each point of the domain in which said model is defined, properties such as porosity and permeability, as well as the value of known stresses, for example the minimum stress and the direction corresponding to said minimum stress $\sigma_{min}$, contour conditions, or in situ stresses. These values can be acquired while drilling or also after drilling, for example by analyzing the samples taken or by inserting into the drilled well measurement tools which take measurements as they travel along the path of the well.

The fluid computational model comprises at least the pore pressure $p_p$, which is the main interaction with the geomechanical computational model. If drilling has been performed by means of a drilling fluid and the maximum stress is to be determined under these conditions, with the drilling fluid, then the fluid computational model also incorporates as data the density $\gamma(z)$ of the drilling fluid used at each level of vertical depth $z(t)$ from the surface of the reservoir while drilling the well. If this is not the case, the surface generated in the well is considered free and is equivalent to the density $\gamma(z)$ of the drilling fluid being zero.

The invention allows determining the value of maximum stress at least in a given section of the drill path. This point of the path is identified as $\vec{r}(t=t_0)$, where $t_0$ identifies the point of the path $\vec{r}(t_0)$ from a specific value of the parameter $t_0$. It was mentioned above that the parametric representation of the path allows readily identifying the features which characterize the method; nevertheless, another mode of representing the path is considered equivalent given that a relationship can be established in a one-to-one manner between both representations.

According to the method:
c) for a given point of the path of the well $\vec{r}(t=t_0)$ with a region of damage due to the collapse in the wall of said well, determining:
  4. the level $z(t_0)$ of vertical depth measured from the surface of the reservoir, and
  5. the section S having a circular configuration corresponding to a section of the well transverse to the path $\vec{r}(t)$ in $t=t_0$, which section has the configuration corresponding to the case in which there was no collapse and in which the maximum stress $\sigma_{max}(t_0)$ is to be determined.

The section corresponding to the case in which there was no collapse is the circular section; if there is a collapse there is a collapse depth. The difference between the section with a collapse and the section without a collapse is the region of damage according to said section. The collapse region corresponds to a volume of fallen material. Nevertheless, given that the method performs assessments in one or more sections of the well, the collapse region in said section corresponds to a flat region that is located between the circumference of the section and the actual profile of the collapse in the same plane.

The level of vertical depth corresponding to the point of the path $\vec{r}(t=t_0)$ allows establishing the height of the column of drilling fluid, which is very relevant in relation to the pressure it exerts on the wall of the well.

d) predetermining an expression of a function for the maximum stress $\sigma_{max}(t, par1)$ where par1 is the set of parameters of the function to be determined;
e) pre-establishing initial values for the parameters par1;
f) defining the error function between the measured caliper $C(t_0)$ and the calculated caliper $C_c(t_0)$ as $E=\|C(t_0)-C_c(t_0)\|$ for a pre-established norm $\|\cdot\|$, where the calculated caliper $C_c(t_0)$ depends on $\sigma_{max}(t, par1)$ and therefore on the set of parameters par1.

For determining the maximum stress $\sigma_{max}$, the method requires that it be expressed as a function of a set of parameters. A specific mode consists of using an analytical expression, for example, in the form $A+Bx+Cx^2+De^x+Ee^{-x}$, where constants A, B, C D and E are constants that fit in an iterative loop as will be described below, and x is the variable with respect to which the correlation is established, with depth being a preferred case.

Other specific cases of variables with respect to which the correlation is established are minimum stress $\sigma_{min}$ or shear stress, or a combination of the indicated variables. Therefore, in the indicated example A, B, C D, and E are the values par1 to be determined.

Other expressions including variables with a physical meaning, such as elastic variables, will be identified in the description of the embodiments.

The iterative method starts from an set of initial values for the set of parameters par1. The method has been found to be convergent in all cases in which it has been used, so the solution does not depend on the initial value chosen in this set of values.

A specific case uses initial values of nil. Nevertheless, if in a particular case there is additional information about the parameters, such as rather crude approximations, using these approximate values can accelerate convergence of the method.

The iterative process allows determining a value of the caliper. This value is identified as the value of the calculated caliper $C_c(t)$. Since it is being calculated at point $t_0$, the annotation $C_c(t_0)$ is used. This value is compared with the measured value $C(t_0)$ and the expression $E=\|C(t_0)-C_c(t_0)\|$ allows measuring the error of the approximation in each iteration. The iterative process continues until the value of the error is less than a pre-established value. A specific instance of a norm is absolute value. Another example of interest uses the Euclidean norm.

Once convergence has been reached, the parameters par1 are those which, when taken to the expression $\sigma_{max}(t, par1)$, allow determining the value of maximum stress $\sigma_{max}$.

The core of the iterative process is carried out through the step identified as g). In this step, the value of maximum stress obtained with the expression $\sigma_{max}(t, par1)$ for the proposed values of par1 is used for determining a value of the calculated caliper, which is the value being compared with the measured value of the caliper.

The value of minimum stress is also used in the calculations of step g). If there is a minimum stress measurement record or an estimate of the same value, the step uses that value. According to one embodiment, the minimum stress $\sigma_{min}$ is also expressed as a correlation as a function of a second set of values par2. Before the first iteration, initial values which allow a first calculation of the minimum stress $\sigma_{min}$ are also proposed. The iterative process not only updates the value of parameters par1, but it also updates the set of parameters par2. So when the method converges, both the maximum stress and a more precise value of minimum stress are obtained.

A hypothesis is used in this calculation, i.e., the region of damage according to the section perpendicular to the path of the well is the intersection of a given ellipse and the circumference corresponding to said section if there were no collapse region. This region of damage is that region which is considered to be object of collapsing and allows calculating the caliper. The caliper will therefore be the difference between the size of the semi-major axis of the ellipse and the radius of the circumference.

Step g) of the method is defined as follows:
g) determining a collapse area, according to the cross-section in $t=t_0$, under the hypothesis that the collapse area is bound by an elliptical section that determines with the ends of the ellipse at the semi-major axes thereof the value of the calculated caliper $C_c(t_0)$ according to the following sub-steps:
6. determining the pressure of drilling fluid used, if any, the pore pressure $p_p$, the maximum stress $\sigma_{max}$ given by the expression $\sigma_{max}(t, par1)$, the minimum stress $\sigma_{min}$, and the mechanical properties of the rock in section S from the geomechanical computational model at the point of the path $\vec{r}(t_0)$;
7. determining the state of stress $\sigma(\theta)$ of the rock along the periphery of section S of the borehole at least as a function of the data from the preceding step where:
   i. $\sigma$ is the scalar value of the equivalent stress,
   ii. $\theta$ is the angle with respect to a system of axes located in section S of the borehole, centered on the center of said section S and with an orientation in the plane containing section S such that $\sigma(\theta=0)=\sigma_{min}$ and $\sigma(\theta=\pi/2)=\sigma_{max}$;
8. determining the collapse angle $\theta_{br}$ as the angle centered on $\theta=\pi/2$ and covering the arc of the periphery of section S where the stress $\sigma(\theta)$ is greater than the maximum allowable stress of the rock;
9. defining the family of ellipses having eccentricity e, contained in the plane of section S, such that:
   iii. the ellipse corresponding to the value of eccentricity e=1, where the eccentricity is defined by the ratio of the value of the semi-minor axis to the semi-major axis, is the circumference established by the circular section S of the well; and,
   iv. the intersection between the ellipse and the circular section S of the well is established at least at points $\pi/2+\theta_{br}/2$ and $\pi/2-\theta_{br}/2$ as well as the symmetrical points $-\pi/2+\theta_{br}/2$ and $-\pi/2-\theta_{br}/2$ thereof, respectively;
10. defining a safety factor $F=\Sigma\sigma_{ext}/\Sigma\sigma_{res}$ where $\Sigma\sigma_{ext}$ is the sum of external forces on the rock at a given point of the rock, which depend at least on the stresses in situ, on the density of the drilling fluid ($\gamma$) should there be any, on the elastic properties of the rock, and on the pore pressure $p_p$; and,
where $\Sigma\sigma_{res}$ is the sum of resistance forces of the rock at the same point, which depend on the stress tensor, on the resistance properties of the rock, and on the angle of internal friction of the rock;

11. determining the function $F(\theta, e)$ as the safety factor F evaluated at a point of the ellipse defined by the eccentricity e for a value of the angle $\theta$;
12. establishing a cutoff threshold value $\theta_0 < \pi/2$;
13. determining the value of the eccentricity $e_0$ closest to one which verifies $F(\theta_0, e_0) = f_0$, where $f_1$ is a pre-established reference value close to one;
14. establishing as an estimated region of damage, according to the section S of the well and at the vertical level z, the intersecting region between the ellipse of eccentricity $e_0$ and the circumference of the section S of the well;
15. establishing as a value of the caliper $C_c(t_0)$ the difference between the major side (b) of the ellipse of eccentricity $e_0$ and the radius of circumference (D/2) of the section S of the well.

The method does not require calculating the state of stress in inner regions of the plane of section corresponding to inner regions of the rock, as it is sufficient to initially determine the state of stress at the point of the path of the well where section S is located, considering that the material was removed after drilling.

The calculation can be done by means of known techniques, for example by means of Kirsch equations from the pore pressure $p_p$, maximum stress $\sigma_{max}$, minimum stress $\sigma_{min}$, and the mechanical properties of the rock in the section S. It should be pointed out that the maximum stress $\sigma_{max}$ and minimum stress $\sigma_{min}$ have values established within the iterative process, since initial values were obtained in the first iteration, and in the remaining iterations the values are those corresponding to the expressions of $\sigma_{max}$ and $\sigma_{min}$ with the parameters updated in each iteration.

The state of stress of the rock along the circular path established by the section of the borehole is defined by $\sigma(\theta)$, $\theta$ being the angle along the circumference which coincides with the perimeter of the well in a given section. The equivalent stress $\sigma$ is a scalar taking the value of the equivalent stress, equivalent being understood as the value of one-dimensional stress equivalent to a state of stress determined by the three main stresses. A particular instance of equivalent stress is Von Mises stress.

Although the state of stress is independent of the reference system chosen in the embodiments, for the sake of clarity, the origin of the angle $\theta=0$ is considered to be a point of the circumference where $\sigma(\theta=0)=\sigma_{min}$ and the angle increases, such that $\sigma(\theta=\pi/2)=\sigma_{max}$. This angle is taken from the rotation about the axis established by the tangent to the path of the well.

Carrying out the same method with a change in reference with respect to the reference thus chosen but by using the same functional correspondence is considered equivalent.

Once the stress $\sigma(\theta)$ along the periphery of the circumference has been determined, the collapse angle $\theta_{br}$ is established as the angle covering the arc of circumference of the section S where $\sigma(\theta) > \sigma_{adm}$ is verified, $\sigma_{adm}$ being the value of the maximum allowable stress of the rock; i.e., the arc where the stress exceeds the maximum stress of the rock and causes the material to give way.

The depth of damage has not been determined in this calculation.

Based on function $\sigma(\theta)$, the method according to the invention carries out step 9.

The family of ellipses is parameterized based on a single parameter, the eccentricity e defined as the ratio of its semi-minor side or axis a and semi-major side or axis b; e=a/b. When the eccentricity takes the value of one, the circumference corresponding to the circular section S of the well when there is no collapse is recovered. If the eccentricity e is gradually reduced from the value of one, the ellipse cuts off the circumference at two points on each major side of the ellipse, hence the four identified cutoff points. The damage will be assessed on one of the sides of the ellipse, i.e., the one corresponding to the position of the collapse angle $\theta_{br}$, given that said collapse angle $\theta_{br}$ corresponds to a centered arc at the end of the major side of the ellipse. This is the orientation the ellipse adopts around the circumference of the circular section S of the well.

In other words, given the collapse angle $\theta_{br}$, which establishes the width of the damage on the wall of the well, the latter is identical for all the ellipses of the defined family of ellipses, and therefore the parameterized family of ellipses always goes through the ends of the collapse angle.

The following steps for calculating the region of damage are steps 10 and 11.

The method of calculation establishes by hypothesis that there is a region of hypothetical damage which has a border with the region where there is no damage according to an elliptical curve. The family of ellipses determined by the parameter e, eccentricity, as defined by step 9, is particularly defined. Likewise, as a hypothesis, although the damaged zone assumed in the previous hypothesis does exist, against what one skilled in the art would consider, the stress at this elliptical border will be considered to be determined by an elastic solution taking the pressure of the drilling fluid, if there is any, as one of the acting external forces.

It has already been indicated that for the value of the eccentricity e=1, the circumference coincides with the wall generated by the drilling tool in the section S. The radius of this circumference will be denoted as R. For any other value of eccentricity e, the parametric curve $r(\theta)$ as a function of the angle and running along the ellipse can be defined by the expression $$r(\theta) = \frac{R}{\sqrt{\cos^2\theta + e^2\sin^2\theta}}$$

where $\theta$ is the angle in the interval $[0, 2\pi)$, R is the radius of the circumference of the well in the section S, and r is the distance from the center of the well to the point of the elliptical curve of eccentricity e established by the angle $\theta$.

It has been indicated that it "can be defined" since there are infinite parametric curves running along the same ellipse; nevertheless, the method is independent of the mathematical expression used to represent the ellipse. Therefore, any way of representing the same ellipse is considered equivalent to the method according to the invention.

Next, according to the invention, the method establishes the region of damage according to steps 12, 13, and 14.

The safety factor F is defined as the ratio of external forces or stresses acting on the rock with respect to the resistance forces. If the external forces exceed the resistance forces then there is damage in the rock. When the resistance forces are equal to the resistance forces, the safety factor takes the value of one. Nevertheless, instead of the value 1, it is possible to adopt a pre-established safety value $f_0$ other than one established by one skilled in the art according to each particular instance.

In practice, the value of the eccentricity gradually increases from a minimum eccentricity, until finding a value of the eccentricity $e_0$ for which F reaches the value $f_0$. F is not assessed in $\pi/2$ since in all instances it has been found that the function F grows asymptotically to infinity when the angle $\theta$ approaches $\pi/2$.

With this asymptotic behavior of F, one skilled in the art would be discouraged from using the safety factor F function for establishing the value of the eccentricity or considering that the damage is limited by an elliptical curve. Surprisingly, however, it has been experimentally proven that by establishing a cutoff value $\theta_0<\pi/2$ for assessing $F(\theta, e)$ and establishing the eccentricity $e_0$ which makes said function not exceed the value $f_0$, the method allows suitably identifying the ellipse corresponding to the region of damage observed in the experimental results.

Once the eccentricity $e_0$ complying with the preceding criterion has been determined, the method establishes as a region of damage the region located between the ellipse of eccentricity $e_0$ and the circumference.

Once the ellipse of eccentricity $e_0$ has been determined, the calculated caliper is the depth measured between the circumference (ellipse with a value of eccentricity 1) and the end of the semi-major axis of the ellipse of eccentricity $e_0$. This is the value which is compared with the measured caliper for determining if the values of the parameters par1 must be corrected or if the iterative method stops because convergence has been achieved.

The correction of the parameters par1 is carried out by using standard optimization algorithms which vary the set of parameters in a given search space such that the error reaches a minimum.

Examples of optimization algorithms preferably used are the least squares method for linear cases and a generalized conjugated gradient method for non-linear cases.

With this region of damage, the collapse volume, for example, per unit of length in the section S located at a level z is determined. The application of the method along a plurality of discrete points of the vertical coordinate allows establishing: a) if it is possible to establish, at all points of the borehole, drilling parameters making said borehole viable; and b) if this borehole is viable, it allows determining the configuration and volumes of the damage as a function of the vertical level, and therefore establishing the optimal drilling parameters.

The iterative process is defined by the following steps, where the final step provides the value of maximum stress that is sought:

h) establishing a threshold value $\epsilon>0$ and iteratively determining, until achieving convergence, where the error E function is less than said threshold value $\epsilon$, for a pre-established search space in the variables of the set of parameters par1 where the value of the calculated caliper $C_c(t_0)$ is calculated in each iteration according to step g);

i) providing the value of maximum stress in $\vec{r}(t_0)$ as the value $\sigma_{max}(t_0, par1)$ with the set of parameters par1 that made the error E minimum.

According to a specific example of interest, the measured caliper is measured at a plurality of points N of the path of the well which can be expressed as $r(t_i)$, i=0,1,2, ... N-1, such that the error E is the norm of the vector the components of which are the difference between the measured caliper and the estimated caliper according to step g) at each of the N points, where each of the components can be expressed as $C^i(t_0)-C_c^i(t_0)$ con i=0,1,2, ... N-1, determining the valid function $\sigma_{max}(t, par1)$ along at least one segment of the path established by the parameter t.

According to this example, in one segment of the path of the well or in the entirety of the well, a set of points is distributed for which caliper measurements are available. In the iterative process where the values par1 for the expression of the maximum stress $\sigma_{min}(t, par1)$ are adjusted, the error is calculated with the contribution of each of the points since the norm of the error is expressed in the form of a summation extended to all points.

In a specific case, for example in vertical wells, the parameter t is the coordinate z expressing the depth of the point of the well with respect to the outer surface.

Other embodiments will be described below with the help of the drawings.

BRIEF DESCRIPTION OF THE DRAWINGS

These and other features and advantages of the invention will be more clearly understood based on the following detailed description of a preferred embodiment, given solely by way of non-limiting illustrative example, in reference to the attached drawings.

DETAILED DESCRIPTION OF THE ILLUSTRATED EMBODIMENTS

According to the first inventive aspect, the present invention relates to a method of determining the maximum stress $\sigma_{max}$ at a point of the path which describes a drilled well, for example in a well for the injection or production of a gas or oil reservoir.

Figure 1:
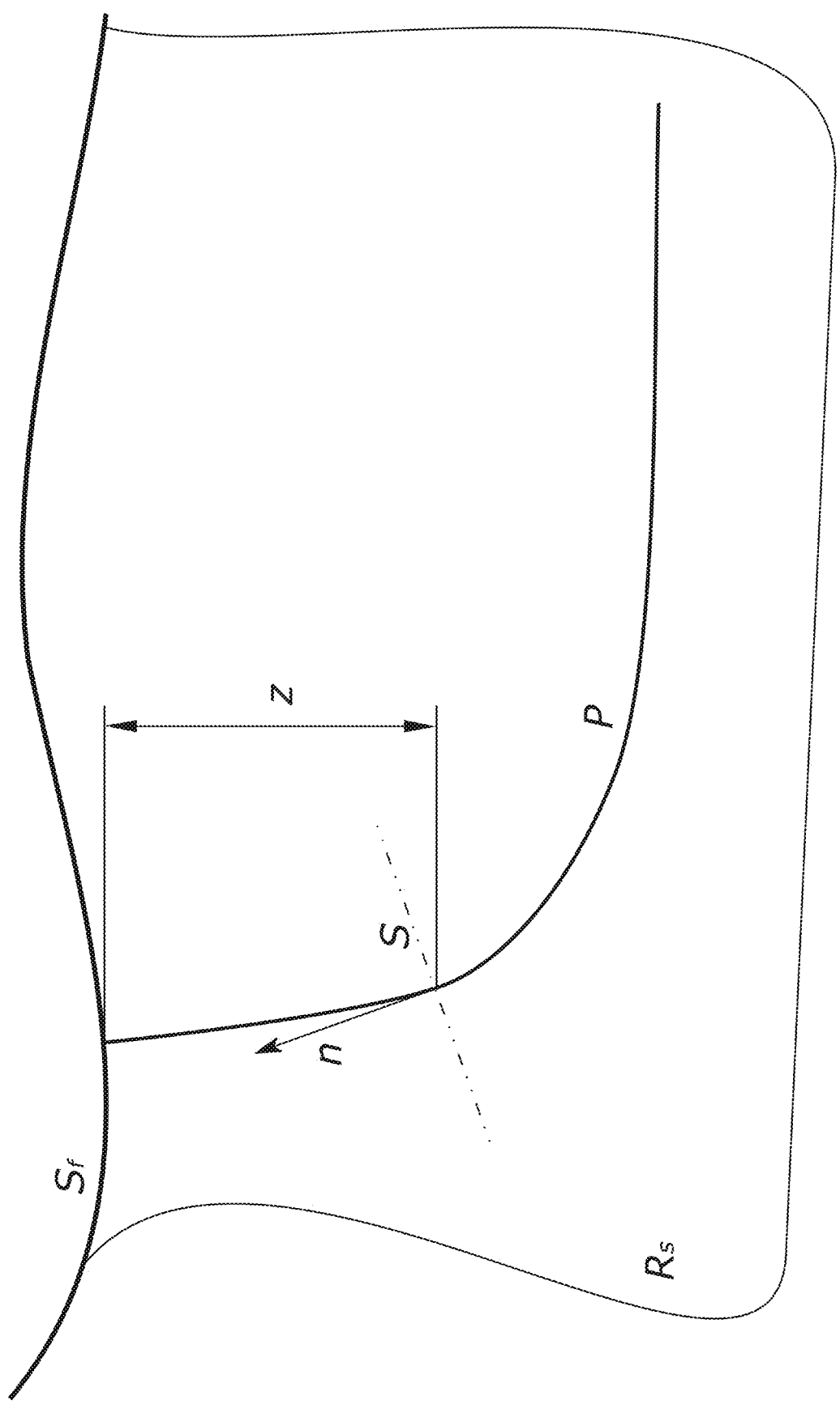
FIG. 1 shows a scheme of an embodiment of a well in an oil reservoir, defined by a drill path, where at a given point of the path a section S is established, on which section there is a region of damage and in which the maximum stress $\sigma_{max}$ is calculated.

FIG. 1 schematically shows the section of a reservoir with oil reserves, where the top line represents the surface of the reservoir and the volume of the reserve identified by the bottom line (Rs) inside of which there is a well (P).

The well (P) is a borehole of circular section S which extends along a path presented by a curve. The curve is shown in FIG. 1, starting from the surface, descending in an almost vertical path, and after increasing its slope, ending in an almost horizontal segment.

According to the invention, step a) of the method establishes a geomechanical computational model which incorporates, among others, data about the drilled well through the curve $\vec{r}(t)$ which defines the path. Other data such as the configuration of the domain, the upper surface, properties of the rock, are also properties that are part of the geomechanical computational model.

Along this path, the maximum stress $\sigma_{max}$ in a section S located at a level z in which there is a region of damage on which measurements of the depth of this region of damage have been taken, is to be calculated. Region of damage is understood as a region where the rock has exceeded the value of maximum allowable stress, causing it to break and subsequently fall off, leaving an empty volume. This volume results in a larger wall with respect to the cylindrical reference which the drilling tool would leave behind with the diameter of the circular section S.

Figure 4:
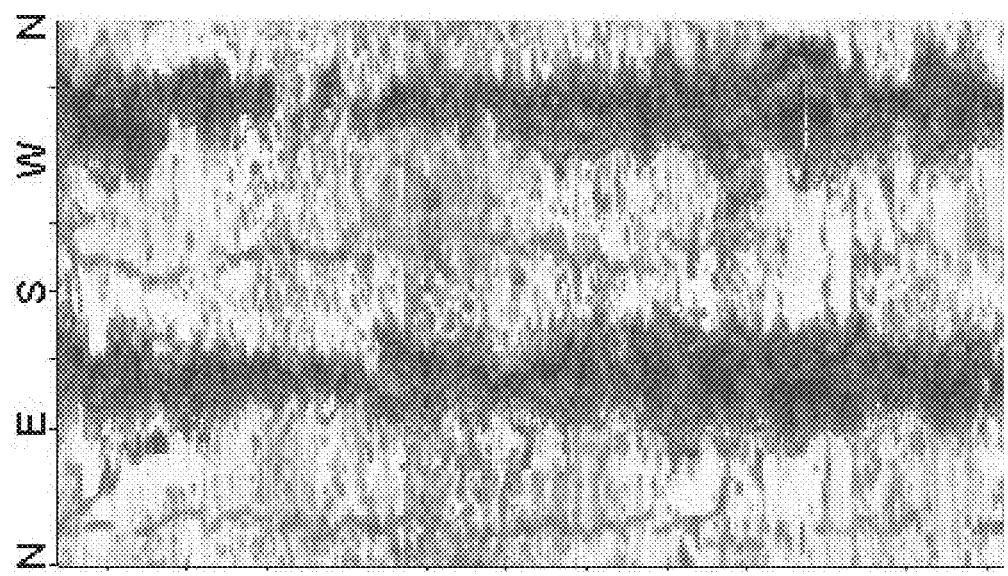
FIG. 4 shows an image of a vertical segment of the well in which the width of damage has been measured as a function of the vertical level and the depth of the damage. The regions with damage are darker in the drawing.

The measurement tools can be based, for example, on touch probes which are supported on the wall in a set of points or along the entire perimeter for each level. FIG. 4 shows a customized grayscale graph, a measurement along a segment of the borehole (according to the vertical coordinate of the graph) and is developed 360°, displaying the damage along the entire perimeter. In the upper part of the graph, the indications of North, East, South, West, and North, (the letters N, E, S, W, and N, respectively) are used to indicate the orientation of the measured data.

The dark zones correspond to a greater depth with respect to the reference which establishes the position of the wall when there is no damage, i.e., when it corresponds to the cylindrical surface of circular section which the tool would theoretically generate. The grayscale represents values starting from 0 according to a predefined scale, with 0 being white. In a given section, the value of greatest depth is the caliper. The caliper thereby obtained is what will be referred to as measured caliper.

In this level z shown in FIG. 1, the tangent n to the path coincides with the normal to the cross-section plane where the region of damage, among others, will be determined as part of the calculation steps.

The plane transverse to the drill path of the well at a pre-established point is represented by means of a discontinuous line.

Figure 2:
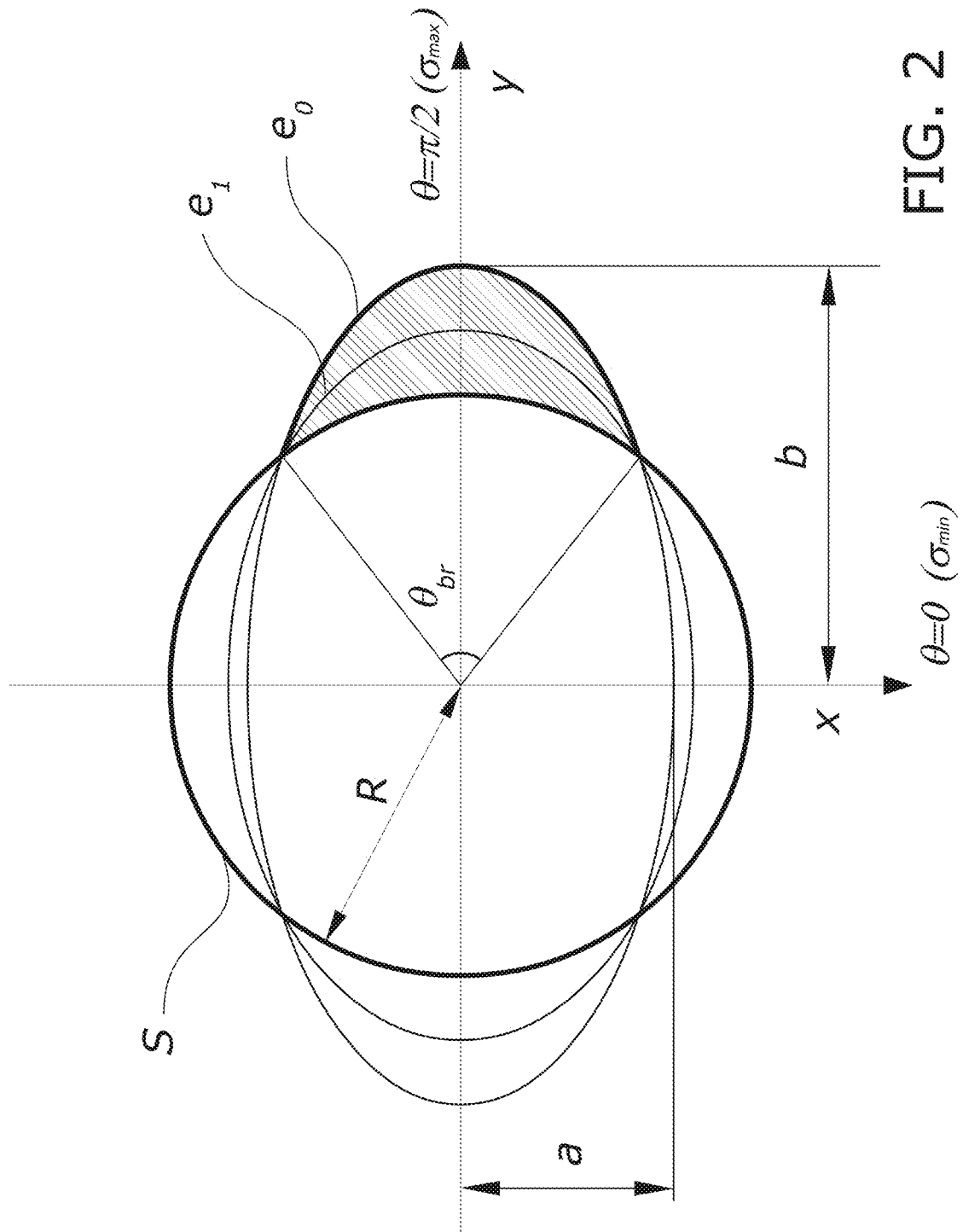
FIG. 2 shows a scheme of an embodiment of a well seen in a sectional view, as well as a pair of ellipses with a different eccentricity used in the steps of calculating the calculated caliper according to the invention, which is subsequently used for comparison with the measured caliper in the section of the well.

FIG. 2 schematically shows a circumference with a thick line which represents the theoretical wall having a circular borehole configuration in the plane of section S.

As indicated above, there is a step among the steps of the method in which it is necessary to determine the region of damage, and for that purpose a geomechanical computational model of the reservoir is generated in a computational system by at least incorporating the rock data and the mechanical properties thereof, and the in situ stress field is also established. The geomechanical computational model establishes a relationship between the force field with forces acting at a given point of the domain and the properties of the material.

The method requires an initial step of acquiring data, primarily the drill path, properties of rock and fluids, data about the drilling fluid if it was used, and data about at least one region of damage. This type of data can be acquired by means of measuring apparatus. The remaining steps, including the generation of numerical models, can be performed in a computational system which finally determines the maximum stress at points of the domain.

For each case it is necessary to determine the forces acting at one point, and they include, among others, those caused by the fluids stored under pressure in porous rocks, or also pressures due to the drilling fluid injected while drilling the well, if there is any, are found.

Additionally, a fluid computational model of the same reservoir is generated in the computational system in this example, which at least models the porous medium suitable for holding liquid. If drilling fluid is used in drilling, then the fluid model must likewise incorporate this fluid and the interaction with the walls of the well. The fluid model includes pore pressure in the porous medium.

Given that the deformations of the porous media give rise to changes in the fluid computational model, and the forces of the latter influence the geomechanical computational model, both models must be coupled to one another.

Through the geomechanical and fluid computational models it is possible, for example, to determine the pore pressure $p_p$ and the mechanical properties of the rock in section S.

In particular, it is also possible to determine the pressure of the drilling fluid, if one is used, and at the moment corresponding to the drilling operation. Although the method determines the maximum stress in an already drilled well, if the damage occurs while drilling due to the drilling conditions, the state of stress of the region of damage involved in the calculation steps must be calculated according to the conditions that caused the damage, i.e., at the time that drilling is performed.

Step c) establishes the point where at least the maximum stress $\sigma_{max}$ will be determined, and step d) proposes the functional expression thereof with the parameters to be adjusted.

Steps e) and f) define the values for starting the iterative process used for the adjustment as well as the measurement of the error used in order to know when convergence has been reached.

The iterative process starts from a proposal for the expression for $\sigma_{max}$ as a function of a set of parameters. After having determined the parameters, the value of maximum stress is given. If either the level of the depth of the point of the well or parameter t are among the parameters, then the value of maximum stress for all the values of the range of t for which the adjustment is valid is given as a result.

The core of the iterative process is step g), in which step the caliper is calculated, said caliper being referred to as "calculated caliper" and identified as $C_c$, is compared with the caliper obtained by measuring the wall of the well, and if it gives rise to a measurement of the error above a pre-established value, then the parameters of the expression of the maximum stress are modified in order to iterate again.

The modification of the parameters is carried out by an optimization algorithm which introduces increases in value for each parameter by observing the variation of the error. Practical examples of algorithms used for reaching convergence in this optimization process are those provided by the "Matlab" calculation tool through what is referred to as the "Optimization Toolbox." The algorithms provided by this toolbox include, among others, "Solve linear," "quadratic," "integer," and "nonlinear optimization problems". There are also other tools available in numerical computation libraries.

In step g), in which the calculated caliper is specifically calculated, the method establishes a specific way of determining the region of damage in the wall of the well by taking as a hypothesis that the shape that this region of damage adopts is elliptical. The method proposes a family of ellipses from among which it determines one ellipse. Once the ellipse corresponding to the state of stress under given criteria has been established, the caliper is located at the end of the semi-major axis of the ellipse.

Having seen the method in a general manner, the details of the method are described below in a more specific manner.

Given the direction normal to the plane of section S, by means of a rotation about said normal, a direction in which the stress is minimum $\sigma_{min}$ and a direction, which is perpendicular to the previous direction, in which the stress is maximum $\sigma_{max}$, are established. These directions are used as axes of reference for establishing the site where the damage occurs and its extent.

During the iterative process, the value of minimum stress $\sigma_{min}$ is known. The value of maximum stress $\sigma_{max}$ to be calculated is the value of the previous iteration or the value proposed for starting the iterative process. This data determines the state of stress for calculating the region of damage.

In the method according to the invention, the parameters determining the maximum stress are updated in each iteration until reaching convergence. In this same instance, the minimum stress $\sigma_{min}$ is known and it does not have to change. In other words, if the minimum stress $\sigma_{min}$ is known, the data is used in all the iterative process steps.

Nevertheless, according to one embodiment the minimum stress $\sigma_{min}$ is also a value which is updated in the iterative process such that upon reaching convergence, the method also provides a more precise value of minimum stress $\sigma_{min}$. In this instance, it is also a known value in a given iteration because the same occurs as with the maximum stress $\sigma_{max}$. In other words, either it is the value of the previous iteration or it is the starting value taken for starting the iterative process.

Once the axes are established, the state of stress in the rock along the curve defined by the circumference corresponding to the wall of the borehole is determined. Based on the state of stress, the value of equivalent stress is calculated by determining the arc of curve in which said equivalent stress is greater than the allowable stress of the rock.

This arc is centered on $\pi/2$ due to the way of constructing the axes of reference, and the width thereof is the collapse angle $\theta_{br}$.

FIG. 2 shows both axes, which are the axes that will correspond to the major and minor sides of a family of ellipses. This family of ellipses is parameterized by means of the eccentricity e defined as the ratio of the semi-minor axis of the ellipse a and the semi-major axis of the ellipse b. For a value of eccentricity equal to 1, the ellipse is the circumference of radius R which corresponds to the circumference representing the wall of the well according to section S. For decreasing values of eccentricity e, ellipses having one end of the major side penetrating the rock, whereas the minor side is smaller than the radius of the well R, are obtained. In relation to the ellipse thereby obtained, the part of the ellipse penetrating the rock and which will be the curve that defines the region of damage will be of particular interest.

The points where the collapse angle starts and finishes are the points where the intersection between the circumference and any of the ellipses of the family parameterized in e is established.

The values of 2b and 2a in FIG. 2 identify the length and width, respectively, of given ellipse. Two ellipses of eccentricity $e_1$ and $e_0$ are likewise shown.

For determining the ellipse which defines the region of damage, the safety factor $$F = \Sigma\sigma_{ext}/\Sigma\sigma_{res}$$

is used, where $\Sigma\sigma_{ext}$ is the sum of external forces on the rock at a given point of the rock, which depend at least on the in situ stresses, on the density of the drilling fluid (γ) should there be any, on the elastic properties of the rock, and on the pore pressure $p_p$; and
where $\Sigma\sigma_{res}$ is the sum of resistance forces of the rock at the same point, which depend on the stress tensor, on the resistance properties of the rock, and on the angle of internal friction of the rock.

This safety factor depends the angle and on the factor of eccentricity, where the value of one identifies the balance between the forces and the resistance capacity. When this balance is broken, damage is considered to exist. Nevertheless, it is possible for one skilled in the art to chose values $f_0$ other than one, though close to it, for example, as a safety factor. Valid values of $f_0$ are comprised in the [0.7, 1.3] range, and more preferably in the [0.8, 1.2] range, and more preferably in the [0.9, 1.1] range, and more preferably in the [0.95, 1.05] range.

Figure 3:
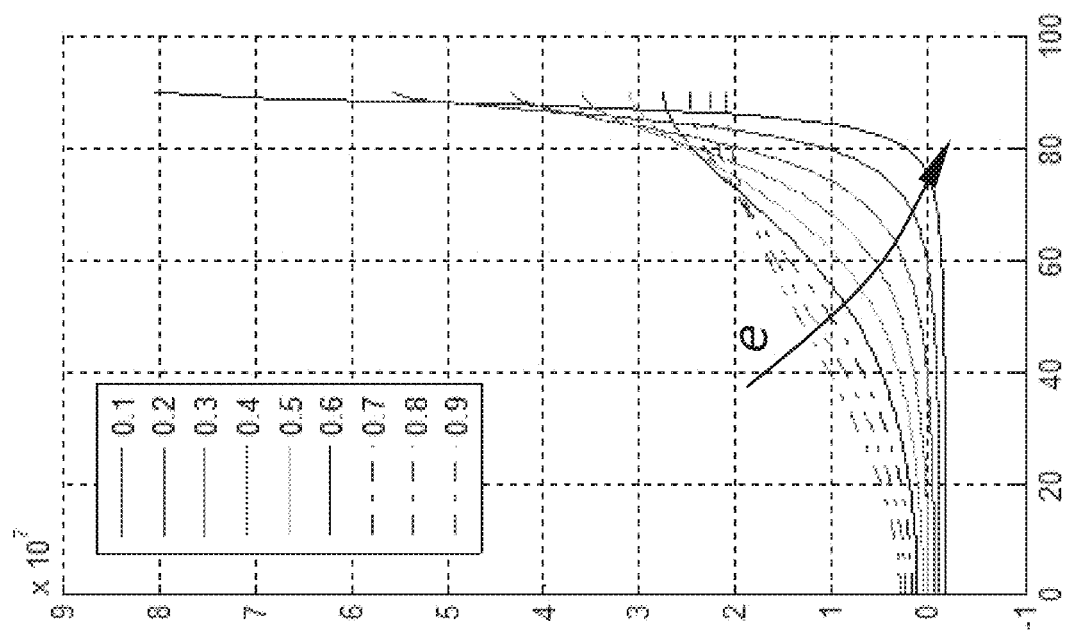
FIG. 3 shows a graph depicting the stresses along the periphery of a family of ellipses. The family of ellipses is represented by means of a plurality of curves identified with an arrow in which the direction in which eccentricity increases is shown. The abscissas show the angle in the section taking the point of minimum stress as a reference.

FIG. 3 shows a graph of the stress as a function of the angle θ, where for values close to $\pi/2$, identified in the drawing as close to 90 given that it is expressed in degrees instead of radians, the stress acquires asymptotically high values as the degree of eccentricity increases.

This fact renders the approach according to the state of the art for the estimation of damage useless since in no case would it be considered that a safe situation exists.

With this hypothesis, the zone of the end of the ellipse reaches values that are not allowable in virtually any instance, which would invalidate this method of determining the region of damage. Nevertheless, it has been found that if this drawback is overcome by eliminating values above the previously specified value $\theta_0 < \pi/2$, then the method predicts the region of damage with great precision.

Once $\theta_0 < \pi/2$ has been established, the value of the eccentricity $e_0$ closest to one which verifies $F(\theta_0, e_0) = f_0 0$ is determined, where $f_0$ is the pre-established reference value close to one.

As described above, FIG. 4 shows an image of the drilled wall in a well showing the zones where damage has occurred. The letters N, E, S, and W identify North, East, South, and West, respectively, and correspond to a perimetral development of 360 degrees ($2\pi$ radians).

The image is taken a posteriori, once the well has been drilled or obtained by sensing while drilling. The values shown allow obtaining the value of the measured caliper which will be compared with the value of the calculated caliper.

Figure 5:
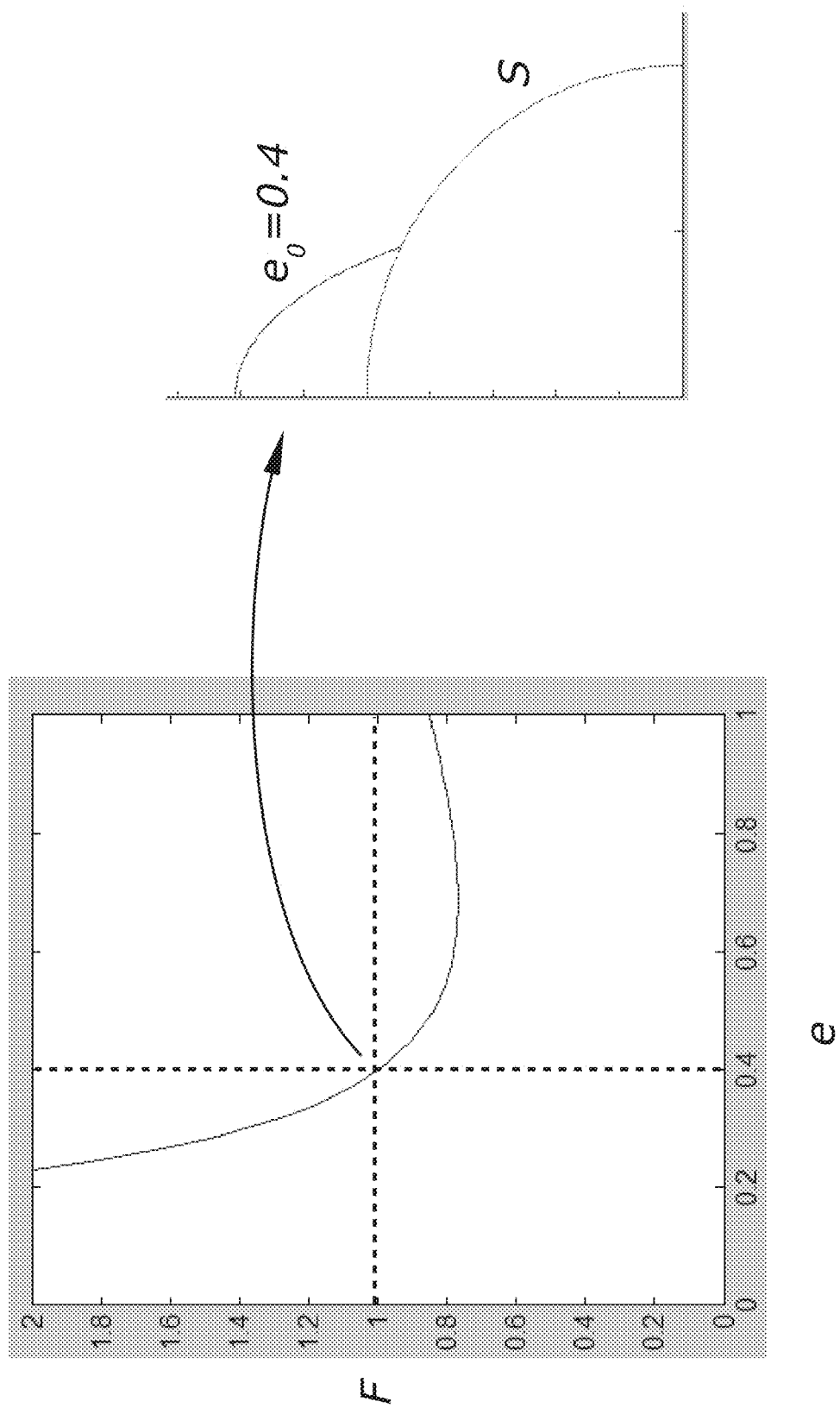
FIG. 5 shows two graphs related to one another, the graph on the left showing a figure with the safety factor F as a function of the eccentricity e with a value of one for considering the equilibrium factor between the external forces and the resistance forces. Once the eccentricity is determined, the ellipse is shown on the right with said eccentricity which determines the transverse area of the damage.
Figure 6:
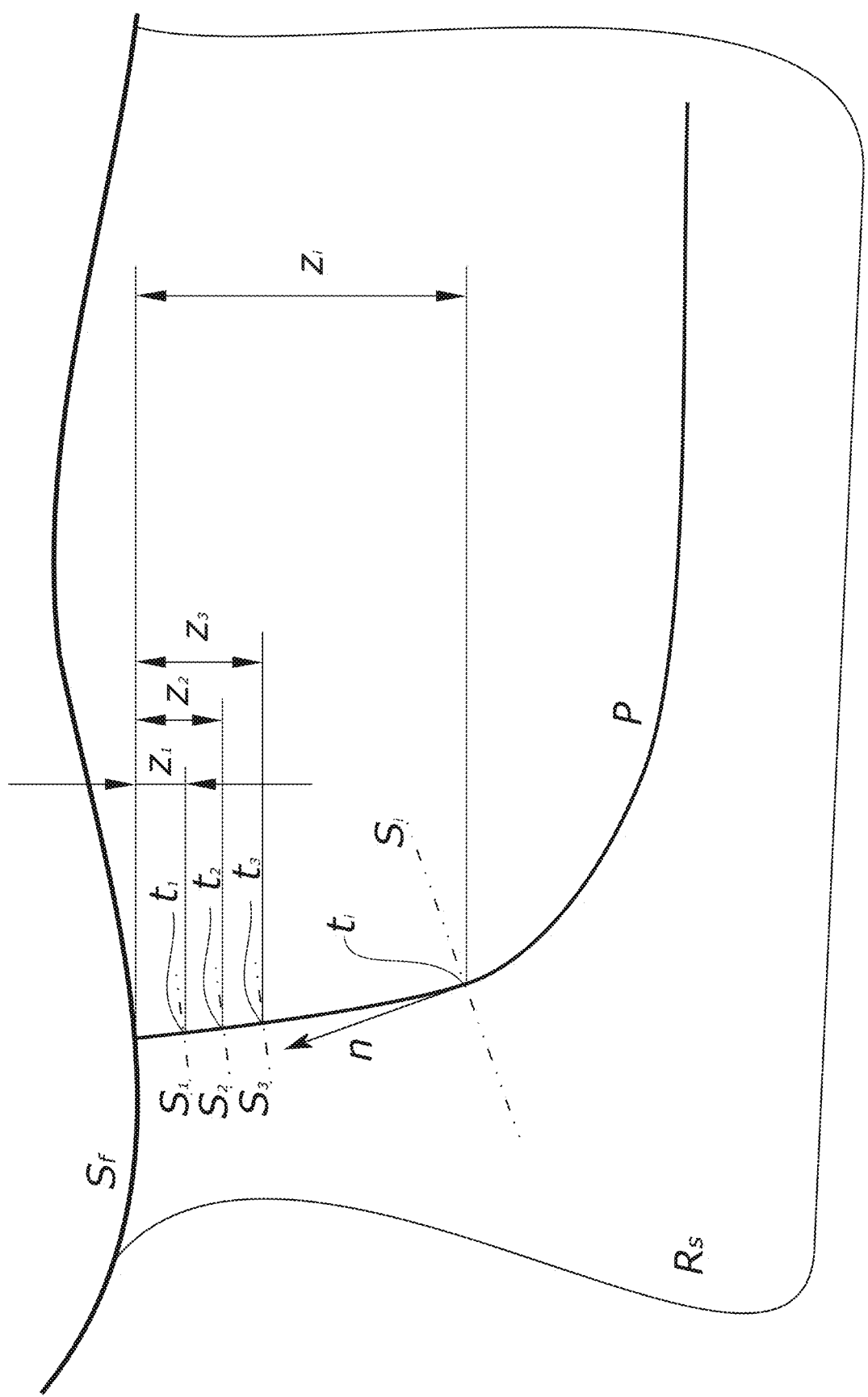
FIG. 6 partially reproduces FIG. 1 as an embodiment in which the determination of the maximum stress $\sigma_{max}$ is carried out in a discrete set of points of the drill path.

FIG. 5 shows a graph of the function $F(\theta_0, e) = f_0 = 1$ with the eccentricity e as a free parameter. It is where the function takes this value $f_0 = 1$, which determines the eccentricity e which in turn defines a single ellipse of the previously defined family of ellipses.

In this embodiment, the ellipse has an eccentricity of 0.4. The right side of the drawing shows a quarter circumference, the circumference representing the section of the wall of the well, and also a quarter of the ellipse having an eccentricity of 0.4. The inner area of the ellipse having an eccentricity of 0.4 is established as the region of damage.

Once the ellipse has been determined, the caliper is also determined as the calculated caliper.

The use of more than one point along the well allows calculating at the same time the maximum stress in a segment of the well. In this instance, one of the parameters of the function to be adjusted is the parameter t or the level z of depth. In this instance, the expression obtained for the maximum stress $\sigma_{max}(t, par1)$ is valid for the segment of the well in which the expression has its domain of definition.

By means of step g), in the final iteration the region or regions of damage is obtained for the points at which the measurement of the measured caliper is provided. With these regions and under the hypothesis of the elliptical-shaped region of damage, it is also possible to determine the angle of the region of damage as the angle between the points of the circumference of the section where the intersection with the ellipse takes place.

The use of specific expressions for maximum stress where $\sigma_{max}(t, par1)$ uses values having a physical interpretation is of particular interest. As a specific instance, the expression of the function $\sigma_{max}(t, par1)$ as a function of the parameters corresponds to an expression of the elastic solution of the maximum stress as a function of the tectonic shifts according to the direction of the maximum stress and the direction of the minimum stress.

In one embodiment, the expression for $\sigma_{max}(t, par1)$ is as follows:

$$\sigma_{max}(t, par1) = \frac{v}{1-v}\sigma_* + E_1 D_1 + E_2 D_2$$

where par1 is the following set of parameters:
v is Poisson's ratio,
$\sigma_*$ is vertical stress,
constants $E_1$ and $E_2$ are Young's moduli in directions 1 and 2, respectively, and,
$D_1$ and $D_2$ are tectonic horizontal deformations according to directions 1 and 2, with $E_1$, $E_2$, $D_1$, and $D_2$ being the two parameters of par1.

Both the minimum stress and the maximum stress can adopt other expressions for correlation with other variables. A sufficiently generic expression can be expressed as $A+Bx+Cx^2+De^x+Ee^{-x}$ with the constants A, B, C, D, and E to be adjusted, where x is the variable with respect to which the correlation is established.

In the case of maximum stress, the variable x may be one of the following:
parameter t,
the depth z(t),
minimum stress $\sigma_{min}(t)$,
shear stress,
or a combination of two or more of the preceding variables.

In the case of minimum stress, the variable x is preferably the parameter t, such that the minimum stress $\sigma_{min}$ can be written as $$\sigma_{min}(t, A', B', C', D', F') = A' + B't + C't^2 + D'e^t + F'e^{-t}$$

with the constants A', B', C', D', F' taking experimentally adjusted values.

To start the iterative process, it is necessary for the expressions of the correlations to have an initial value assigned thereto. One way of giving an initial value is to start from a value which is increasing according to depth. In instances where estimated data about stress is available, said data can be used to determine the values of the constants before iteration starts. The iterative process, which has been proven to be convergent in all cases, will modify these values until giving rise to the correlation which best explains the variation in stress once convergence has been reached.

Any of the expressions used in the correlations can be defined by fragments.

The invention claimed is:

1. A computer-implemented method of determining a maximum stress $\sigma_{max}$ at a point of a path $\vec{r}(t)$ in a well drilled in a reservoir comprising collapsed regions, wherein said method comprises the steps of:
   a) generating a geomechanical computational model in a domain comprising the path $\vec{r}(t)$ of the well that is drilled by at least incorporating rock data and the mechanical properties thereof, and wherein generating said geomechanical computational model includes:
      1. measuring the diameter D of the well using a measurement tool configured to acquire measurements of the interior walls of the well, wherein the measurements are acquired while drilling the well or after the well is drilled,
      2. using the measurement tool, obtaining the measurement of the value of the caliper C(t) measured in at least one collapsed zone, and
      3. a pre-established function of a minimum stress $\sigma_{min}(t)$;
   b) generating a fluid computational model in the same domain by at least incorporating data with respect to a density $\gamma(z)$ of the drilling fluid used in each level of vertical depth z(t) from the surface of the reservoir while drilling the well, wherein said fluid computational model models the rock as a porous medium and comprises a pore pressure $p_p$ in said porous medium;
   c) for a given point of the path of the well $\vec{r}(t=t_0)$ with a region of damage due to the collapse in the wall of said well, determining:
      4. the level $z(t_0)$ of vertical depth measured from the surface of the reservoir, and
      5. a section S having a circular configuration corresponding to a section of the well transverse to the path $\vec{r}(t)$ in $t=t_0$, the section which has the configuration corresponding to the case in which there was no collapse and in which the maximum stress $\sigma_{max}(t_0)$ is to be determined;
   d) predetermining an expression of a function for the maximum stress $\sigma_{max}(t, par1)$ where par1 is the set of parameters of the function to be determined;
   e) pre-establishing initial values for the parameters par1;
   f) defining the error function between the measured caliper $C(t_0)$ and the calculated caliper $C_c(t_0)$ as $$E = \|C(t_0) - C_c(t_0)\|$$

for a pre-established norm where the calculated caliper $C_c(t_0)$ depends on $\sigma_{max}(t, par1)$ and therefore on the set of parameters par1;
   g) determining a collapse area, according to the cross-section in $t=t_0$, under the hypothesis that the collapse area is bound by an elliptical section that determines with the ends of the ellipse at the semi-major axes thereof the value of the calculated caliper $C_c(t_0)$ according to the following sub-steps:
      6. determining a pressure of the drilling fluid used, if any, the pore pressure $p_p$, the maximum stress $\sigma_{max}$ given by the expression $\sigma_{max}(t, par1)$, the minimum stress $\sigma_{min}$, and the mechanical properties of the rock in section S from the geomechanical computational model at the point of the path $\vec{r}(t_0)$;

7. determining the state of stress $\sigma(\theta)$ of the rock along the periphery of section S of the borehole at least as a function of the data from the preceding step where:
   i. $\alpha$ is the scalar value of the equivalent stress,
   ii. $\theta$ the angle with respect to a system of axes located in section S of the borehole, centered on the center of said section S and with an orientation in the plane containing section S such that $\sigma(\theta=0) = \sigma_{min}$ and $\sigma(\theta=\pi/2) = \sigma_{max}$;
8. determining the collapse angle $\theta_{br}$ as the angle centered on $\theta=\pi/2$ and covering the arc of the periphery of section S where the stress $\sigma(\theta)$ is greater than the maximum allowable stress of the rock;
9. defining a family of ellipses having eccentricity e, contained in the plane of section S, such that:
   iii. the ellipse corresponding to the value of eccentricity e=1, where the eccentricity is defined by a ratio of the value of the semi-minor axis to the semi-major axis is the circumference established by the circular section S of the well; and
   iv. an intersection between the ellipse and the circular section S of the well is established at least at points $\pi/2+\theta_{br}/2$ and $\pi/2-\theta_{br}/2$ as well as the symmetrical points $-\pi/2+\theta_{br}/2$ and $-\pi/2-\theta_{br}/2$ thereof, respectively;
10. defining a safety factor $$F = \Sigma\sigma_{ext}/\Sigma\sigma_{res}$$

where $\Sigma\sigma_{ext}$ is the sum of external forces on the rock at a given point of the rock, which depend at least on the in-situ stresses, on the density of the drilling fluid ($\gamma$) if any, on the elastic properties of the rock, and on the pore pressure $p_p$; and where $\Sigma\sigma_{res}$ is s the sum of resistance forces of the rock at the same point, which depend on the stress tensor, on the resistance properties of the rock, and on the angle of internal friction of the rock;

11. determining a function $F(\theta, e)$ as the safety factor F evaluated at a point of the ellipse defined by the eccentricity e for a value of the angle $\theta$;
12. establishing a cutoff threshold value $\theta_0 < \pi/2$;
13. determining a value of the eccentricity $e_0$ closest to one which verifies $F(\theta_0, e_0) = f_0$, where $f_0$ is a pre-established reference value close to one;
14. establishing as an estimated region of damage, according to the section S of the well and at the vertical level z, the intersecting region between the ellipse of eccentricity $e_0$ and the circumference of the section S of the well;
15. establishing as a value of the caliper $C_c(t_0)$ the difference between the major side (b) of the ellipse of eccentricity $e_0$ and the radius of circumference (D/2) of the section S of the well;

h) establishing a threshold value $\varepsilon > 0$ and iteratively determining, until achieving convergence, where an error E function is less than said threshold value $\varepsilon$, for a pre-established search space in the variables of the set of parameters par1 where the value of the calculated caliper $C_c(t_0)$ is calculated in each iteration according to step g);

i) based at least in part on the set of parameters par1 that made the error E minimum, determining the maximum stress $\sigma_{max}$ at the given point of the path of the well $\vec{r}(t_0)$ in the reservoir.

2. The method according to claim 1, wherein the measured caliper is measured at a plurality of points N of the path of the well which can be expressed as $r(t_i), i=0,1,2, \ldots N-1$, such that the error E is the norm of the vector, the components of which are the difference between the measured caliper and the estimated caliper according to step g) at each of the N points, where each of the components can be expressed as $C^i(t_0) - C_c^i(t_0)$ with $i=0,1,2, \ldots N-1$ determining the valid function $\sigma_{max}(t, par1)$ along at least one segment of the path established by the parameter t.

3. The method according to claim 1, wherein the pre-established function of the minimum stress $\sigma_{min}(t)$ is pre-established as $\sigma_{min}(t, par2)$, with par2 being a second set of parameters for which there is established a first estimated value, and wherein the iterative process according to step g) establishes as the search space both parameters par1 and parameters par2.

4. The method according to claim 3, wherein the minimum stress $\sigma_{min}(t, par2) = $ $$\sigma_{min}(t, A', B', C', D', F') = A' + B't + C't^2 + D'e^t + F'e^{-t}$$

with constants A', B', C', D', F' taking experimentally adjusted values.

5. The method according to claim 1, wherein the parameters par1 of the maximum stress $\sigma_{max}$ are expressed in the form $A + Bx + Cx^2 + De^x + Ee^{-x}$ with constants, A, B, C D and E to be adjusted, and where x is the variable with respect to which the correlation is established, being one of the following:
   parameter t,
   depth z(t),
   minimum stress $\sigma_{min}(t)$,
   shear stress,
   or a combination of two or more of the preceding variables.

6. The method according to claim 1, wherein the expression of the function $\sigma_{max}(t, par1)$ as a function of parameters par1 corresponds to an expression of the elastic solution of the maximum stress as a function of the tectonic shifts according to the direction of the maximum stress and the direction of the minimum stress.

7. The method according to claim 6, wherein the expression for $\sigma_{max}(t, par1)$ is as follows:

$$\sigma_{max}(t, par1) = \frac{\upsilon}{1-\upsilon}\sigma_* + E_1 D_1 + E_2 D_2$$

where par1 is the following set of parameters:
   $\nu$ is Poisson's ratio,
   $\sigma$ is vertical stress,
   constants $E_1$ and $E_2$ are Young's moduli in directions 1 and 2, respectively, and,
   $D_1$ and $D_2$ are tectonic horizontal deformations according to directions 1 and 2, with $E_1, E_2, D_1$, and $D_2$ being the two parameters of par1.

8. The method according to claim 1, wherein an estimate of the width angle of the damage in the wall is calculated as the angles covering the intersecting points between the ellipse of eccentricity $e_0$ and the circumference of the section of the well.

9. The method according to claim 1, wherein the path of the well $\vec{r}(t)$, rock data, and caliper measurements for the generation of a numerical model are obtained while drilling.

10. A non-transitory computer program product stored on a computer-readable medium and comprising computer-implementable instructions that, when executed by a computer, cause the computer to carry out the method according to claim 1.

11. The method according to claim 1, wherein the measurement tool is a sensor configured to measure by sensing the walls of the well.

12. The method according to claim 1, wherein the measurement tool includes at least one touch probe that extends radially within the interior of the well until the probe contacts the physical walls of the well.

\* \* \* \* \*